United States Patent [19]

Guichard et al.

[11] 3,913,631

[45] Oct. 21, 1975

[54] AEROSOL DEVICE

[75] Inventors: Jean-Claude Guichard, Paris; Anne Gaillard, Ballancourt-sur-Essone; Jean Marie Michel Paul Blainie, Paris, all of France

[73] Assignee: I.E.R.A.M. (Institut Europeen de Recherches et d'Applications Mediales), Paris, France

[22] Filed: June 20, 1974

[21] Appl. No.: 481,228

[52] U.S. Cl. .................. 141/3; 222/193; 261/104
[51] Int. Cl.² ........................................ B65B 3/04
[58] Field of Search ............ 222/57, 190, 187, 193; 239/326; 261/104, 107; 73/29; 141/2, 3, 20

[56] References Cited
UNITED STATES PATENTS

| 922,582 | 5/1909 | Hauck | 222/187 X |
| 2,839,279 | 6/1958 | Harris et al. | 261/104 |
| 3,224,637 | 12/1965 | Muller | 222/57 |
| 3,400,919 | 9/1966 | Schall | 261/104 X |

FOREIGN PATENTS OR APPLICATIONS

| 540,959 | 9/1955 | Belgium | 239/326 |

Primary Examiner—Robert B. Reeves
Assistant Examiner—John P. Shannon
Attorney, Agent, or Firm—Oblon, Fisher, Spivak, McClelland & Maier

[57] ABSTRACT

An aerosol device comprises a chamber closed off at one end by a porous membrane, at least one liquid reservoir communicating with the chamber, an inlet to the chamber for a vaporizing gas, and means for discharging liquid from the reservoir into the chamber when the pressure in the chamber drops owing to the drying out of the liquid on the surface of the membrane.

14 Claims, 3 Drawing Figures

AEROSOL DEVICE

This invention relates to an aerosol device suitable for providing aerosol sprays.

Aerosol devices have been proposed which comprise a column closed off vertically by a micro-porous wall or membrane which carries a film or layer of liquid. A gas stream passes upwardly through the wall or membrane and consequently the layer or film of liquid, the gas micro jets thus formed passing through the liquid and causing it to evaporate and form particles or droplets which constitute the aerosol spray. In general however, the liquid to be formed into a spray is itself a solution and its evaporation causes a variation in concentration of the solvents in the remaining liquid layer and the aerosol spray. This can be very disadvantageous in certain fields, for example in the medical field. According to a first aspect of the invention there is provided a method of filling an aerosol device including a porous membrane and a pressure chamber comprising injecting into the pressure chamber a gas at a determined flow rate upstream of the membrane, wetting the membrane, and admitting a predetermined quantity of liquid to be vaporized at each pressure drop occurring in the pressure chamber when the liquid dries off the porous membrane.

According to the second aspect of the invention there is provided an aerosol device comprising a chamber closed off at one end by a porous membrane, at least one liquid reservoir communicating with the chamber, an inlet to the chamber for a vaporizing gas, and means for discharging liquid from the reservoir into the chamber when the pressure in the chamber drops owing to the drying out of the liquid on the surface of the membrane.

The invention makes use of the fact that when gas is passed through a porous layer at a given flow rate, there is a difference in the pressure drop which exists when the porous layer is dry and when the porous layer is covered with a liquid film.

This phenomenon can be illustrated by the following: if a container is closed by a micro-porous membrane (for example with polyamide having pores with a diameter of $7 \pm 2$ microns), and gas at a flow rate of $3 \, l/mn/cm^2$ crosses one square centimeter of the dry membrane, the pressure drop across the membrane is $40 g/cm^2$. If the membrane is covered with water and gas is blown through at the same flow rate, the pressure upstream of the membrane is $600 g/cm^2$. After a very short time the water layer is completely broken up and the membrane starts to dry. If the gas flow rate is maintained constant, the pressure drops very quickly and stabilizes at $40 g/cm^2$. But if at this moment more water is added to the membrane, one notices that the pressure upstream returns to its initial value and the aerosol is regenerated.

This phenomenon of the loss in pressure as soon as the liquid to be vaporized no longer covers the dividing wall is exploited in the present invention to release a controlled supply of liquid as soon as the above phenomenon occurs and therefore only when the liquid is required. Furthermore, the increase in pressure is used to stop this supply of liquid and in this way a preset quantity of the liquid to be vaporized can be delivered when necessary.

In the invention, the chamber upstream of the dividing wall is preferably in communication with at least one liquid reservoir in equilibrium with the pressure at its maximum value in the chamber so that this liquid flows into the latter when the sudden drop of pressure occurs.

Preferably the quantity of liquid flowing into the chamber each time is maintained constant, the time for the pressure to equalize between the chamber and the liquid reservoir being the same for the same gas flow rate.

The aerosol container is preferably provided with a liquid reservoir connected by a duct to the chamber upstream of the dividing wall and in the case of more than one reservoir by at least one mixing device. The quantity of liquid required to be vaporized is preferably obtained by means of a restriction in the duct leading from the liquid reservoir.

In one particular arrangement, each liquid reservoir is formed by an inverted bottle blocked by a capillary tube opening into the duct connected to the vaporization chamber. The bottle is arranged in a closed chamber which is itself connected to the said duct.

When it is desired to mix several liquid constituents, several liquid reservoirs can be provided as has already been stated. In this case it may be necessary to mix the various constituents when required in order to avoid interaction, decomposition or other alterations of the constituents of the mixture which might occur if they are mixed a certain time before their administration.

The invention will now be described in more detail, by way of example only, with reference to the accompanying drawings, in which.

Figure 1:
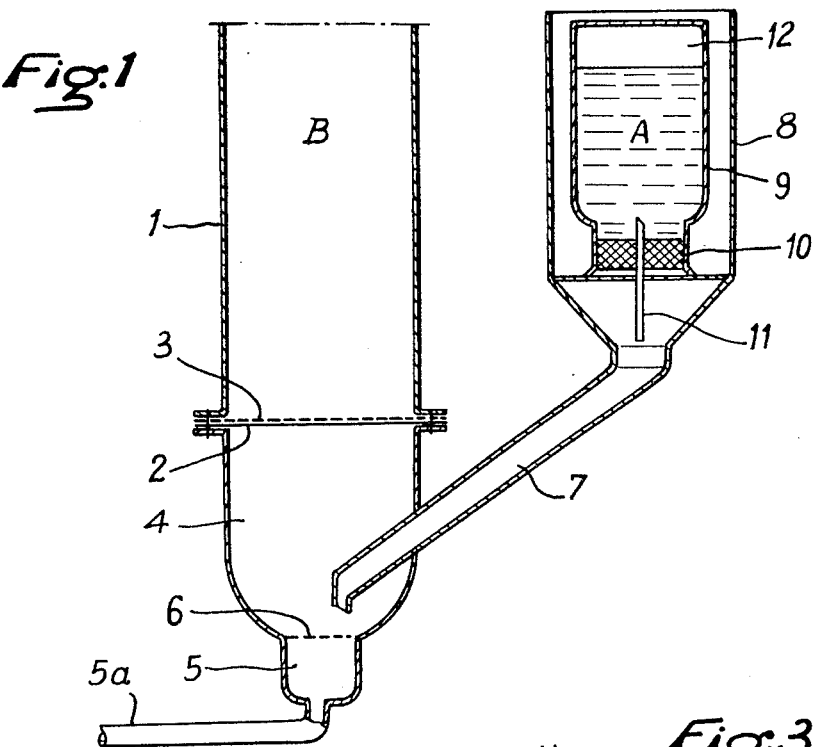
FIG. 1 shows an aerosol device in diagrammatic form.

In FIG. 1, a vertical column 1 of an aerosol device is provided with a horizontal micro porous membrane 2 provided with a grille 3. An enclosure 4 which is provided with a restriction 5 covered with a grille 6 at its base, is provided at the base of the vertical column 1 and separated from it by the membrane 2. The vapor forming gas is admitted through the restriction 5 by a delivery tube 5a.

A nozzle 7 opens into the enclosure 4 and communicates with a chamber 8 receiving an inverted flask 9 containing the liquid A to be vaporized. A stopper 10 closes the flask 9 and a capillary tube 11 passes through the stopper 10 from the inside of the flask 9 to communicate with the nozzle 7.

This apparatus is used in the following way:

Assuming the membrane 2 is wet with liquid, a gas is blown into the chamber by means of the delivery tube 5a from a compressor (not shown) which provides a pressure of $600 g/cm^2$ at a flow rate of $15 l mn$ across the end membrane 2. An aerosoc spray is obtained at B downstream of the membrane 2. A pocket of gas 12 forms above the liquid A in the flask 9 and this is at the same pressure as that in the chamber 4. The gas blown through the membrane 2 may be conveniently air or oxygen for example.

When the membrane 2 begins to dry, the pressure in the chamber 4 drops and in order to maintain the pressures in the chambers 12 and 4 equal, the pocket of gas 12 expands and causes a certain quantity of liquid A to be ejected through the capillary tube 11. This liquid flows through the nozzle 7 onto the grille 6 where the gas flow disintegrates into drops which are projected onto the lower surface of the membrane 2. The liquid passes through the membrane, wets it and forms on its surface a liquid film a few tenths of a centimeter thick. At the same time the pressure returns to its initial value in the chamber 4 and the gas rises in the flask 9 after having expelled the liquid in the capillary tube 11 so that the new volume 12 is compressed until the gas reaches the pressure of 600g/cm$^2$ (the approximate height of the liquid A in the flask). It is the capilliary forces in the tube 11 which prevent the flow of liquid when the pressures within chambers 4 and 12 are equal.

The choice of the capillary tube 11 and the pressure in the chamber 4 allows the threshold when the liquid is expelled from the flask 9 to be connected so the required volume of liquid can be delivered.

As an example, if a pressure of 500g/cm$^2$ is chosen, more liquid is expelled before the membrane 2 is completely dry so that, from the point of view of the concentration and composition of the aerosol spray, variation is noticeable. The described aerosol devices provides an aerosol spray automatically and automatically adjusts the liquid supply.

For example if a microporous membrane 2 is used having orifices of 7 microns in diameter, the capillary tube 11 would have a diameter of 12/10thmm and the flask 9 would contain 7 to 8 cubic centimeters of aqueous solution which may be 5% by weight of acetylcholine.

For the flow rate of 15 liters per minute with an excess pressure of 500g/cm$^2$ upstream of the membrane, a concentration of acetylcholine in the aerosol is obtained which is approximately equal to 90 grams per liter of aerosol obtained at the output of the aerosol device. In the particular case, it has been noted that the results obtained depend on the direction of use of the microporous membrane, probably because of its capillary structure. Thus, if the membrane is turned over, an additional 26 grams per liter of acetylcholine are obtained in the aerosol. The time between each reply is approximately 2 minutes and the whole of the flask is used in an hour during which the concentration of the active product in the aerosol spray remains constant.

When the membrane is in the first position, the mean size of the particles forming the aerosol spray is 2.7 microns.

In a particular embodiment not described, the capillary tube 11 is advantageously placed so that its lower end is in contact with the wall of the nozzle 7 so as to facilitate the flow of the liquid A.

Furthermore the aerosol device can be provided with a device for separating particles situated on the aerosol nozzle beyond the dividing wall or the microporous membrane. This separation device can be for example either a stopping partition, a filter or a microporous membrane which is inclined and placed in the path of the aerosol spray and on which the droplets and large particles settle. This is arranged so that these particles which are beyond a certain acceptable size form a liquid film that can be returned to the membrane 2. The separation device can alternatively be made of small glass pellets or "vigreux" spikes which fulfill the same function or which complete the stopping wall.

Thus with a separation device of this type, to take for example, as described above, a 5% solution of aqueous acetylcholine, the droplets passing through the separator will have a size which does not exceed 2.7 microns.

Figure 2:
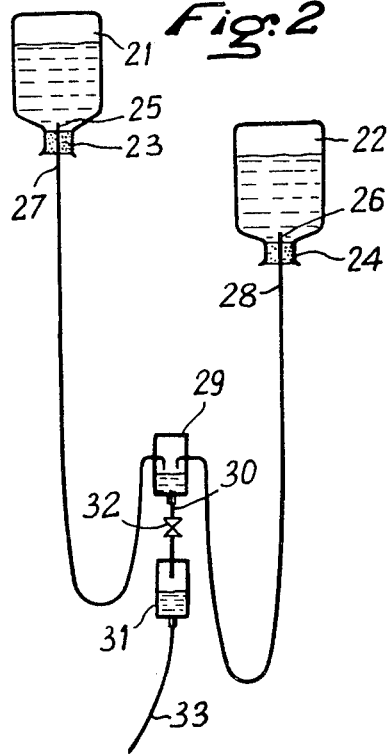
FIGS. 2 and 3 show different supply arrangements for the aerosol device shown in FIG. 1.

FIG. 2 shows an aerosol device arranged to mix two constituent liquids held in flasks 21 and 22. The two flasks are extended so that their relative heights can be adjusted. The stopper 23 and 24 of the two flasks are pierced by the sharpened ends 25 and 26 of two capillary tubes 27 and 28. The tubes 27 and 28 open into a mixer 29 which is emptied by a tube 30 leading to a slow control device 31 working in a conventional drop by drop manner, thus allowing the flow rate to be seen visually. The capilliary tubes 27 and 28 limit the discharge of each of the two components owing to the properties of the tubes and the liquid and also the difference in levels between the liquids in each of the two containers and the outlets of their respective tubes. According to physical laws, the discharge rate is a function of:

1. The difference in levels which corresponds to the hydrostatic pressure;
2. The viscosity, the internal diameter and the length of the tube which determines the pressure drop in the tube, any bends or possible obstacles in the tube being ignored as these are small as the tube is a capillary tube;
3. The external diameter at the outlet of the tube and the surface tension which determines the weight of the drops at the outlet of the tube in the mixer 29. In determining the conditions in which each of the two constituents must be mixed in the mixer 29, the flow rate into the mixer can be regulated with a high degree of accuracy and similarly the discharge rate from the mixer can be controlled accurately with the regulator 31. Furthermore a conventional flow rate control valve 32 can be inserted into the tube 30 for safety, but the flow rate device 31 will obviously be the sum of the two flow rates from the tubes 27 and 28 into the mixer 29. The manufacture of the component products can thus be provided with the flasks such as 21 and 22, one or more tubes similar to the tubes 27 and 28 which indicate the flow rate at the outlet ends and as a result of the difference between the liquid levels and the tube outlets, which flow rate being indicated for each tube; this can be determined by calibration. It should nevertheless be pointed out that the distance between the free surface of the liquid in the flask and the outlet of the tube will vary gradually as the liquid is expelled. If the containers are tall and thin, this variation will be much greater than for the containers which are wide and short. That is why it is useful to have the discharge be sufficiently small so that the difference in the levels between the base and the cork will correspond to a negligible hydrostatic pressure. Devices for moving the liquid employing syphons can also be used. Furthermore, it is desirable to calibrate the tubes with the flask half filled. Thus, in determining the properties of a range of tubes for each product and each mean difference in levels, one can choose for example the flow rate corresponding to the medical description, that is the required tube diameter corresponding to the hydrostatic pressure. By repeating the operation for each of the constituents, one can insert into the mixer 29 a certain number of tubes each coming from a flask which discharges into the mixer 29 a given amount of each constituent at a given flow rate. The mixture can thus be removed drop by drop. Of course, the capacity of the different flasks can be chosen as a function of the total quantity of each composition that it is desired to administer preferably during the same time period. Such a device allows one of the compositions to be administered at a time or the flow rate to be changed. It also allows the quantity or the nature of the other compositions to be changed in the meantime. When the doctor has stated on his prescription the total quantity of each composition and the flow rate of each, or the times at which certain compositions must be administered, the operator establishes an administration program by choosing the class of compositions for which the capacity corresponds with the total quantity to be administered during the whole of the treatment, or if that is too long, the total quantity to be administered during a given period. He then chooses the tubes with the aid of tables or graphs as indicated above, and he places them in the mixer 29 after regulating the height of the flask so that the mean difference in levels between the level of the liquid in each flask and the output of its corresponding tube into the mixture is equal to that indicated on three tables or graphs. The liquids then flow then into the mixer 29 at a preselected rate, by calibration, and the mixture flows through the tube 30 into the regulator 31 which allows the flow rate to be perceived visually. The mixing therefore takes place in perfect antiseptic conditions particularly if care has been taken to disinfect the end of the tube for introducing it into the mixer 29, this latter being preferably disinfected as well as the various devices downstream which lead the liquids of the mixture towards the aerosol device shown in FIG. 1. If the mixer 29 and the regulator 31 are also of as small volume as possible as well as the tubes 30 and 33, or their volume can be reduced by flattening them, one can reduce to a minimum the eventual gas input in the device. If a good vacuum is formed above the liquids in the different flasks, the safety of the device is assured. The rest of the procedure, notably concerning the conditioning of the regulator 31 and the general disinfection is carried out in a conventional manner. It will be noticed that what has just been said on the subject of the flask and the control devices allows the manufacturer who provides the flasks and the accessories to use the same principles and devices, and to the user to reuse the devices for other applications and in particular for other methods of administration (through perfusion for example). This applies equally well in the case shown in FIG. 3.

If it is desired to administer a solid product, such as for example, one that is pulverizable and soluble, one can begin by dissolving this solid composition in a solvent which may be either one of the constituents of the mixture to be administered, or a carrier capable of being administered, such as for example, a physiological serum. The solution is first put in a flask which can contain, as well as the solvent, one or more soluble solid constituents.

Figure 3:
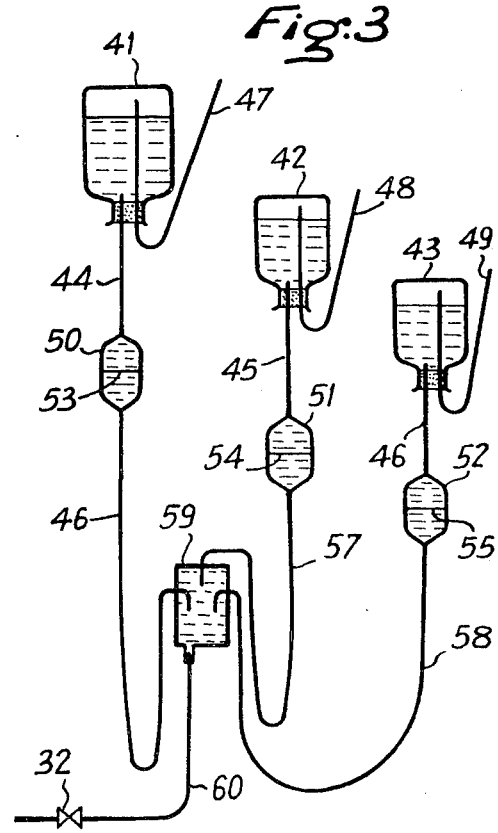

In FIG. 3, an arrangement for applying a mixture of constituents to an aerosol device is shown. Three flasks, 41, 42 and 43 are provided with stoppers through which the sharpened and of non-capillary tubes 44, 45 and 46 pass respectively. The stoppers of each flask are also pierced by vent-tubes 47, 48 and 49 which allow a gas into the upper portion of the inverted flask. The gas may be filtered atmospheric air or any antiseptic gas. Each of the tubes 44, 45 and 46 communicates with a valve 50, 51 and 52, each divided by a membrane 53, 54 and 55 and the membranes may be biological membranes. The outlets of each of the valves 50, 51 and 52, are respectively connected to tubes 56, 57 and 58 which lead each liquid composition into a mixer 59 which is in communication with a tube 60 leading to the aerosol device shown in FIG. 1, if necessary via an intermediate capillary tube.

In the arrangement shown in FIG. 3, one determines for each type of bulb and membrane, the flow rate which is a function of the average difference in liquid levels, thus allowing for each composition the difference in levels to be defined and the membrane providing a given flow rate to be specified for each of the components which might be contained in a flask of which the capacity is determined. To use this device, the manufacturer calibrates the flask provided with the tubes, bulb and membranes and indicates for each constituent, the flow rate as a function of the difference in level and the membrane used on graphs or tables from the which the user can choose his various parts.

If the tubes are not capillary tubes, one can consider the pressure drops as being relatively negligible and the physical properties of the liquids and the membranes become much more important. A regulator valve 32 can be provided in the tube 60 to avoid any unforeseen accident.

In their application to aerosol devices, these arrangements can also be used more conveniently, either to supply intermittently or continuously at will, the part of the apparatus serving as the container for the supply so as to project the intended production of a spray cloud, or to supply intermittently or continuously, with a flow rate which varies with the function of diameter, of length and of surface tension of the composition, the aerosol device.

This latter application has the advantage of avoiding any possible change of the active components, the vaporization occurring simultaneously with use.

In the same way one can imagine the mixture of several medicines being carried out when required or an alternate succession of different principal medicines being vaporized.

In the examples above, only one mixture is used. If it is desired to mix the liquids of more than two flasks, several mixtures can be arranged in fashion to incorporate successfully a certain number of compositions into an initial composition.

The aerosol device has been described for use with medical applications however, the same can be used for any other application where it is required to mix liquids and distribute them at a given rate and at a given composition, either under vacuum, or with the help of a gas. Also in the case of these devices, various safety devices can be incorporated to avoid any accidental increase in the output rate. Flow limiters can be included as well as alarm devices.

The described aerosol device finds numerous applications in the medical field and can also be used in the field of air conditioning or for example for creating artificial atmosphere.

What we claim is:

1. A method of filling an aerosol device, which includes a porous membrane disposed at one end of a pressure chamber, comprising the steps of:
    injecting a gas at a determined flow rate into said pressure chamber upstream of the membrane,
    wetting the membrane, and
    admitting a predetermined quantity of liquid to be vaporized as a pressure drop occurs in the pressure chamber when the liquid dries off the porous membrane.

2. A method as claimed in claim 1 wherein the chamber is in communication with at least one reservoir of liquid in equilibrium with the pressure in the chamber when it is at its maximum value so that this liquid is expelled into the chamber when the equilibrium is broken by the sudden drop of pressure in the pressure chamber at the moment when the liquid begins to dry off the membrane.

3. A method as claimed in claim 2 wherein the quantity of liquid flowing into the pressure chamber after each sudden pressure drop is maintained constant.

4. A method as claimed in claim 2 wherein the chamber is in communication with at least two liquid containing reservoirs each being provided with at least one flow rate regulator, the method comprising an initial phase during which a certain number of circuits for the liquid in each reservoir are calibrated by measuring the flow rate as a function of the difference in level between the mean level of the liquid in each reservoir and the outlet of the corresponding circuit, a second phase during which the flow rate necessary for the distribution of the liquid of each reservoir is determined, a third phase during which the circuit and the difference in levels for the liquid of each reservoir are chosen, and a fourth phase during which each reservoir is connected to the aerosol device by the chosen circuit taking into account the difference in levels determined during the first phase as a function of the flow rate chosen which determines a given distribution.

5. A method as claimed in claim 4 employing a single aerosol device.

6. An aerosol device comprising a chamber closed off at one end by a porous membrane, at least one liquid reservoir communicating with the chamber, an inlet to the chamber for a pressurized, vaporizing gas, and means for discharging liquid from the reservoir into the chamber when the pressure in the chamber drops owing to the drying out of the liquid on the surface of the membrane.

7. A device as claimed in claim 6 wherein each liquid reservoir is connected directly by a duct to the pressure chamber of the aerosol device.

8. A device as claimed in claim 7 wherein the desired quaintity of liquid to be vaporized is attained by a tube of restricted diameter opening into the duct.

9. A device as claimed in claim 7 wherein each liquid reservoir is formed by an inverted flask closed off by a stopper through which a capillary tube passes, the capillary tube opening into the duct connected to the pressure chamber, and the flask being arranged in the chamber which is itself connected to the duct.

10. A device as claimed in claim 7 wherein the ducts from several liquid reservoirs terminate in a common duct which opens into the aerosol device.

11. A device as claimed in claim 10 wherein a flow rate regulator is arranged in said common duct.

12. A device as claimed in claim 6 wherein at least one flow rate regulator is provided by a capillary tube.

13. A device as claimed in claim 6 wherein at least one flow rate regulator is provided by a membranefilter.

14. A device as claimed in claim 7 wherein the ducts from each reservoir are provided by tubes having different diameters and arranged to give a preselected flow rate for a given pressure drop across its length

* * * * *